US012800322B2

(12) United States Patent
Zhang

(10) Patent No.: US 12,800,322 B2
(45) Date of Patent: Nov. 17, 2026

(54) NAVIGATION METHOD AND APPARATUS, COMPUTER DEVICE AND STORAGE MEDIUM

(71) Applicant: TENCENT TECHNOLOGY (SHENZHEN) COMPANY LIMITED, Shenzhen (CN)

(72) Inventor: Tian Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 436 days.

(21) Appl. No.: 17/698,379

(22) Filed: Mar. 18, 2022

(65) Prior Publication Data

US 2022/0214178 A1 Jul. 7, 2022

Related U.S. Application Data

(63) Continuation of application No. PCT/CN2021/076034, filed on Feb. 8, 2021.

(30) Foreign Application Priority Data

Apr. 3, 2020 (CN) ......................... 202010259114.3

(51) Int. Cl.
*G01C 21/34* (2006.01)

(52) U.S. Cl.
CPC ................................ *G01C 21/3423* (2013.01)

(58) Field of Classification Search
CPC .......................... G01C 21/3423; G01C 21/343
See application file for complete search history.

(56) References Cited

U.S. PATENT DOCUMENTS 10,861,333 B1 * 12/2020 Cajias .................... G01C 21/32
2015/0253142 A1 * 9/2015 Kornhauser ....... G01C 21/3415 701/408
(Continued)

FOREIGN PATENT DOCUMENTS

CN 102589558 A 7/2012
CN 103900584 A 7/2014
(Continued)

OTHER PUBLICATIONS

Kim Hyun Woo, KR-101704634-B1, Feb. 8, 2017 (Year: 2017).*
(Continued)

*Primary Examiner* — Adam R Mott
*Assistant Examiner* — Heather J Keniry
(74) *Attorney, Agent, or Firm* — Banner & Witcoff, Ltd.

(57) ABSTRACT

A navigation method and apparatus, a computer device, and a storage medium. The method includes: obtaining route information of a target route corresponding to a target start point and a target end point to obtain a route information set, where the target route corresponds to at least two sequential navigation scenarios; determining target route information based on the route information set; and switching a navigation scenario based on a sequence corresponding to each navigation scenario and providing route guidance in each navigation scenario according to obtained route guidance information, where the route guidance information is determined through route guidance according to a current positioning point and the target route information.

20 Claims, 6 Drawing Sheets

(56) References Cited

U.S. PATENT DOCUMENTS

| | | | | |
|---|---|---|---|---|
| 2016/0298977 | A1* | 10/2016 | Newlin | G01C 21/3679 |
| 2018/0011489 | A1* | 1/2018 | Oba | B60W 60/001 |
| 2018/0231982 | A1* | 8/2018 | Yunoki | G05D 1/0061 |
| 2019/0271557 | A1* | 9/2019 | Chen | G01C 21/3629 |
| 2020/0041291 | A1 | 2/2020 | Dunnette | |
| 2021/0253164 | A1* | 8/2021 | Irie | B62D 5/046 |

FOREIGN PATENT DOCUMENTS

| | | | | |
|---|---|---|---|---|
| CN | 104019808 | A | 9/2014 | |
| CN | 104864879 | A | 8/2015 | |
| CN | 106643771 | A | 5/2017 | |
| CN | 106687766 | A | 5/2017 | |
| CN | 107478237 | A | 12/2017 | |
| CN | 111397628 | A | 7/2020 | |
| KR | 101704634 | B1 * | 2/2017 | G05D 1/0212 |

OTHER PUBLICATIONS

Chinese Office Action dated for 2020102591143 dated Dec. 22, 2021.

International Search Report for PCT/CN2021/076034 dated, May 17, 2021 (PCT/ISA/210).

Written Opinion of the International Searching Authority for PCT/CN2021/076034 dated, May 17, 2021 (PCT/ISA/210).

* cited by examiner

NAVIGATION METHOD AND APPARATUS, COMPUTER DEVICE AND STORAGE MEDIUM

CROSS-REFERENCE TO RELATED APPLICATION(S)

This application is a continuation application of International Application No. PCT/CN2021/076034, filed on Feb. 8, 2021, which claims priority to Chinese Patent Application No. 202010259114.3, filed with the China National Intellectual Property Administration on Apr. 3, 2020, the disclosures of which are incorporated by reference in their entireties.

FIELD

The disclosure relates to the field of computer technologies, and in particular, to a navigation method and apparatus, a computer device, and a storage medium.

BACKGROUND

With the development of computer technologies, navigation technologies have appeared and facilitated people's travel.

A travel route can be complicated and include multiple navigation scenarios, such as requiring the user to first cycle to a place, walk to another place, and then drive from that place to the destination. Traditional navigation technologies have limited capabilities in such situations. These technologies can only determine navigation for one navigation scenario at a time and require another navigation determination when the user arrives at the next place. For example, using systems implemented with traditional navigation technologies, the user needs to initiate navigation for multiple times, and after each segment of navigation ends, needs to manually switch to a next navigation scenario to initiate navigation again to continue navigation. Every navigation determination or initiation also requires access to a data network, additional bandwidth, and resources. The above problems only worsen as the number of navigation scenarios increases.

SUMMARY

According to various embodiments provided in the disclosure, a navigation method and apparatus, a computer device, and a storage medium that can improve navigation efficiency are provided.

According to an aspect of the embodiments of the disclosure, a navigation method may be provided, including: obtaining route information of a target route corresponding to a target start point and a target end point, to obtain a route information set; where the target route corresponds to at least two sequential navigation scenarios; determining target route information based on the route information set; and switching a navigation scenario based on a sequence corresponding to each navigation scenario, and providing route guidance in each navigation scenario according to route guidance information; where the route guidance information is determined according to a current positioning point and the target route information.

According to an aspect of the embodiments of the disclosure, a navigation apparatus may be provided, including: a route information obtaining module, configured to obtain route information of a target route corresponding to a target start point and a target end point, to obtain a route information set; where the target route corresponds to at least two sequential navigation scenarios; a target route information determining module, configured to determine target route information based on the route information set; and a switching module, configured to switch a navigation scenario based on a sequence corresponding to each navigation scenario, and provide route guidance in each navigation scenario according to route guidance information; where the route guidance information is determined according to a current positioning point and the target route information.

According to an aspect of the embodiments of the disclosure, a computer device may be provided, including a memory and a processor, the memory storing computer-readable instructions; and when executing the computer-readable instructions, the processor performing the following: obtaining route information of a target route corresponding to a target start point and a target end point, to obtain a route information set; where the target route corresponds to at least two sequential navigation scenarios; determining target route information based on the route information set; and switching a navigation scenario based on a sequence corresponding to each navigation scenario, and providing route guidance in each navigation scenario according to route guidance information; where the route guidance information is determined according to a current positioning point and the target route information.

According to an aspect of the embodiments of the disclosure, one or more nonvolatile storage mediums (or one or more non-transitory storage mediums) may be provided, storing a computer programs, the computer programs, when executed by one or more processors, performing the following: obtaining route information of a target route corresponding to a target start point and a target end point, to obtain a route information set; where the target route corresponds to at least two sequential navigation scenarios; determining target route information based on the route information set; and switching a navigation scenario based on a sequence corresponding to each navigation scenario, and providing route guidance in each navigation scenario according to route guidance information; where the route guidance information is determined according to a current positioning point and the target route information.

Details of one or more embodiments of the disclosure are provided in the accompanying drawings and descriptions below. Other features, objectives, and advantages of the disclosure become apparent from the specification, the drawings, and the claims.

BRIEF DESCRIPTION OF THE DRAWINGS

To describe the technical solutions in embodiments of the disclosure more clearly, the following briefly describes the accompanying drawings required for describing the embodiments. The accompanying drawings in the following description show merely some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

To make objectives, technical solutions, and advantages of the disclosure clearer and more comprehensible, the disclosure is further described in detail with reference to the accompanying drawings and embodiments. It is to be understood that the specific embodiments described herein are only used for explaining the disclosure, and are not used for limiting the disclosure.

Figure 1:
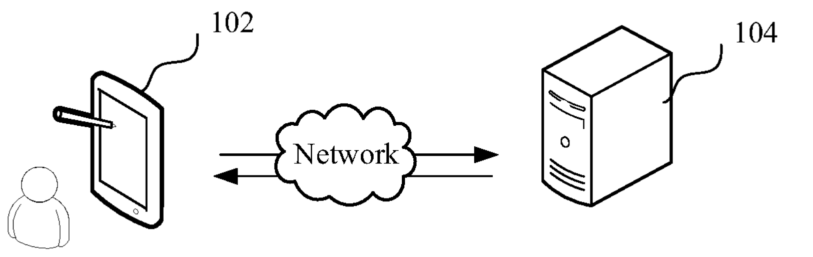
FIG. 1 is a diagram of an application environment of a navigation method according to an embodiment.

A navigation method provided in the disclosure may be applied to an application environment shown in FIG. 1. The terminal 102 communicates with the server 104 by using a network. The terminal 102 may be specifically a desktop terminal or a mobile terminal. The mobile terminal may be specifically at least one of a mobile phone, a tablet computer, a notebook computer, and the like. The server 104 may be implemented by an independent server or a server cluster that includes a plurality of servers. Both the terminal 102 and the server 104 may be used independently to perform the navigation method provided in the embodiments of the disclosure. Both the terminal 102 and the server 104 may be alternatively used in cooperation to perform the navigation method provided in the embodiments of the disclosure.

Figure 2A:
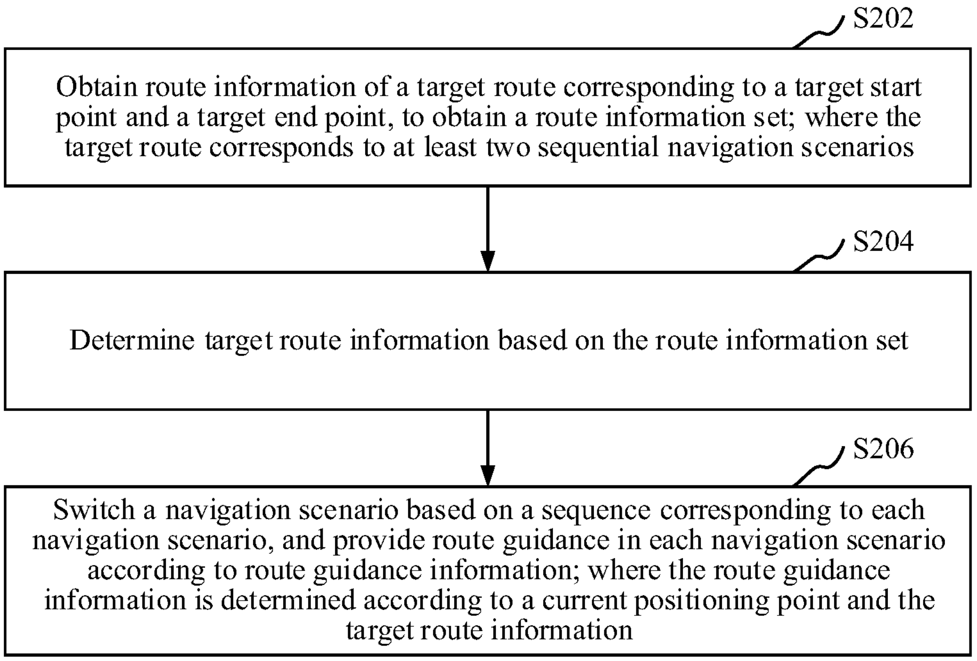
FIG. 2A is a schematic flowchart of a navigation method according to an embodiment.

In an embodiment, as shown in FIG. 2A, a navigation method is provided, executed by a computer device. The computer device may be a terminal or a server in FIG. 2A. In this embodiment, for example, the computer device is the terminal in FIG. 2A. The method includes the following operations:

Operation 202: Obtain route information of a target route corresponding to a target start point and a target end point to obtain a route information set, where the target route corresponds to at least two sequential navigation scenarios.

The target start point is a navigation start point specified by a user. The target start point is usually determined according to a current location of the user. Therefore, the target start point may be a location obtained by positioning the current location of the user. The target start point may also be a specific location inputted by the user; or a specific location selected by the user on a map. The target end point is a navigation end point specified by the user, and may be a specific location inputted by the user, a specific location selected by the user on a map, or a default location specified and stored by the user in advance. The target start point and the target end point may be wide regions such as a railway station X, a scenic region Y, and a shopping mall Z, or may be specific locations in a region such as a store X1 in a shopping mall X and a scenic spot Y1 in the scenic region Y.

A route corresponding to the target start point and the target end point is a route obtained through route planning with the target start point as a start point and the target end point as an end point. There may be multiple routes corresponding to the target start point and the target end point, some of these routes may correspond to a single navigation scenario, and some other routes correspond to at least two sequential navigation scenarios. The target route is one of these routes that corresponds to at least two sequential navigation scenarios. The sequential navigation scenarios refer to that a sequence of the navigation scenarios is determinate. For example, the target route may correspond to three sequential navigation scenarios, which are sequentially: walking navigation, driving navigation, and cycling navigation.

It may be understood that the navigation scenarios herein refer to scenarios that are divided according to travel modes. Different navigation scenarios correspond to different travel modes. Navigation scenarios include, but are not limited to, cycling navigation, walking navigation, and driving navigation. In the cycling navigation scenario, the user may travel by bicycle, electric scooter, or the like. In the walking navigation scenario, the user may travel on foot. In the driving navigation scenario, the user may travel by car.

For example, from a location A to a location B, routes may include: a route 1 of first cycling from the location A to a location C and then walking from the location C to the location B. In this case, corresponding navigation scenarios include the cycling navigation scenario and the walking navigation scenario. The routes also include: a route 2 of first driving from the location A to a location D and then walking from the location D to the location B. In this case, corresponding navigation scenarios include the driving navigation scenario and the walking navigation scenario. The routes also include: a route 3 of driving from the location A to the location B. In this case, a corresponding navigation scenario only includes the driving navigation scenario.

The route information of the target route includes a string of longitude and latitude coordinate points on the target route, and a navigation scenario identifier, route guidance information, environmental information, and the like that correspond to each longitude and latitude coordinate point in the string of longitude and latitude coordinate points. The navigation scenario identifier is used to uniquely identify a navigation scenario. The target route may be considered as a connection line of the string of longitude and latitude coordinate points in the route information.

For example, after specifying the target start point and the target end point on the terminal, the user triggers a control related to route planning, and the terminal obtains a route planning request. According to the route planning request, the terminal may obtain the route information of the target route obtained through route planning based on the target start point and the target end point. Route information corresponding to multiple target routes forms a route information set.

It may be understood that in practical applications, when multiple navigation scenarios are combined, the user may be provided with a more precise travel mode. However, in consideration of different navigation requirements of different users, when obtaining route information, in addition to obtaining the route information of the target route, the terminal may also obtain route information of a route corresponding to single-scenario navigation, to meet navigation requirements of different users. For example, when the user needs to arrive at the store Y in the shopping mall X from the current location, the user may directly navigate to the store Y through a combination of cycling navigation and walking navigation. In this case, the terminal first navigates the user to the entrance of the shopping mall X through cycling navigation, and then switches to walking navigation to navigate the user from the entrance of the shopping mall X to the store Y. The user may also directly select cycling navigation to navigate to the entrance of the shopping mall X, and then end the navigation. The combined multi-scenario navigation is more precise than single-scenario navigation.

In an embodiment, the user may input the start point and the end point respectively in input boxes corresponding to a start point and an end point displayed on the interface of the terminal, and click the "confirm" button. Then, the terminal obtains the route planning request.

In an embodiment, the terminal stores all route information in a preset region. The preset region herein may be classified according to administrative intervals, such as country, province, city, and district. After obtaining the route planning request, the terminal may perform route planning according to the stored route information, and determine the route information of the target route corresponding to the target start point and the target end point.

In another embodiment, after obtaining the route planning request, the terminal may send the route planning request to a server. After parsing the route planning request, the server obtains the target start point and the target end point carried in the route planning request, performs route planning according to the target start point and the target end point, and obtains route information of the target route corresponding to the target start point and the target end point to form the route information set.

In an embodiment, after receiving the route planning request sent by the terminal, the server may obtain current road status information in real time, including but is not limited to a road status (road construction, subway construction, and the like), a vehicle status (the number of vehicles), a congestion status, "no road" in a road section, and the like. According to the road status information, the target start point, and the target end point, the server performs route planning and obtains the route information of the target route corresponding to the target start point and the target end point to form the route information set.

Operation 204: Determine target route information based on the route information set.

Different route information in the route information set corresponds to different target routes. After obtaining the route information set, the terminal may display route information of each target route, and start navigation after obtaining a navigation trigger operation. After starting navigation, the terminal determines, according to the obtained navigation trigger operation, route information corresponding to the navigation trigger operation from the route information set as the target route information.

In an embodiment, the interface of the terminal may display a navigation trigger mark, and the navigation trigger operation is a trigger operation performed on the navigation trigger mark. The navigation trigger mark may be prompt information or a trigger control that may trigger the terminal to start navigation. After receiving the trigger operation performed on the navigation trigger mark, the terminal starts navigation. The trigger operation performed on the navigation trigger mark is a preset operation performed on the navigation trigger mark. The trigger operation may specifically be a touch operation, a cursor operation, a key operation, or a voice operation. The touch operation may be a touch click operation, a touch press operation, or a touch slide operation, and may also be a single-touch operation or a multi-touch operation. The cursor operation may be an operation of controlling a cursor to click or an operation of controlling a cursor to press. The key operation may be a virtual key operation or a physical key operation.

Figure 2B:
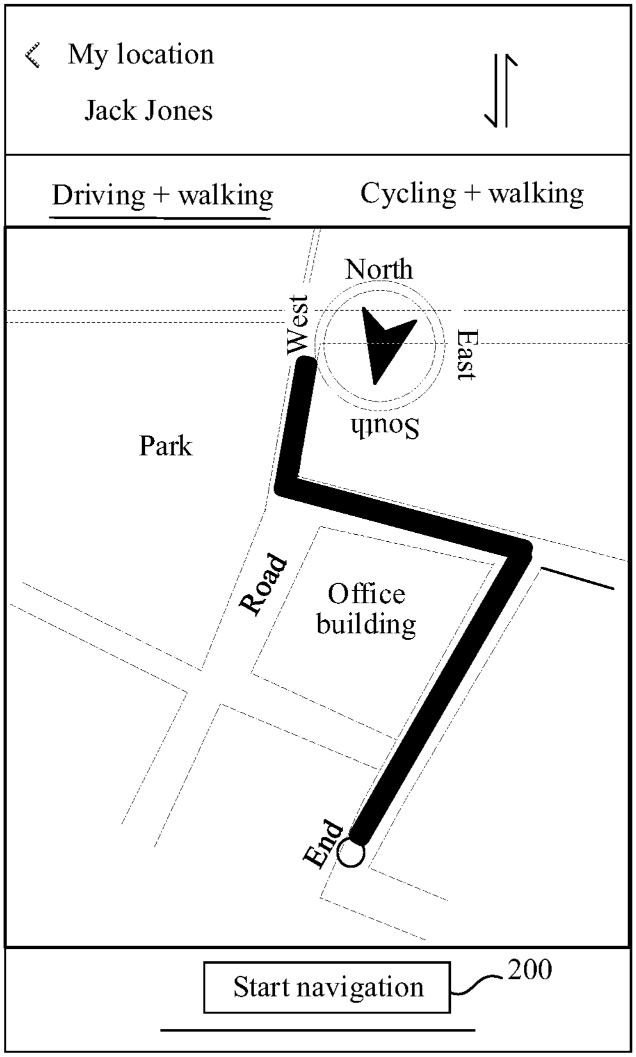
FIG. 2B is a schematic diagram of an interface for displaying route information according to an embodiment.

In an embodiment, the terminal may display route information on a map interface. FIG. 2B is a schematic diagram of an interface for displaying route information on a terminal according to a specific embodiment. Referring to FIG. 2B, in this embodiment, there are two target routes. One is a route combining the cycling navigation scenario and the walking navigation scenario, and the other is a route combining the driving navigation scenario and the walking navigation scenario. When the user clicks the "driving+walking" route, the terminal displays route information corresponding to the route combining the driving navigation scenario and the walking navigation scenario. When the user selects the "cycling+walking" route, the terminal displays route information corresponding to the route combining the cycling navigation scenario and the walking navigation scenario. The interface of the terminal is also provided with a start navigation button 200. FIG. 2B shows the route information that corresponds to the route combining the driving navigation scenario and the walking navigation scenario and that is displayed on the interface of the terminal when the user selects the "driving+walking" route. In this case, when the user clicks the start navigation button, the terminal determines the route information as the target route information and starts navigation according to the route information.

In another embodiment, the terminal may display the route information in the form of voice broadcast.

Operation 206: Switch a navigation scenario based on a sequence corresponding to each navigation scenario, and provide route guidance in each navigation scenario according to route guidance information; where the route guidance information is determined according to a current positioning point and the target route information.

Since the target route is planned in advance, the sequence of navigation scenarios is already fixed. After starting the navigation, the terminal may switch the navigation scenario in the sequence corresponding to each navigation scenario. In each navigation scenario, the terminal obtains a current positioning point of the user, determines route guidance information according to the current positioning point and the target route information, and then provides route guidance according to the route guidance information.

In an embodiment, when providing route guidance, the terminal may display route guidance information on the current navigation interface, where the route guidance information is navigation information used for navigation, including at least one of text guidance information and icon indication information. The text guidance information is information for navigation guidance through a text, for example, a specific road name, and direction information such as "go straight ahead for 500 meters and then turn right". The icon indication information is information for navigation guidance through an icon, such as arrow indications such as going straight, turning left, and turning right displayed on the interface.

In another embodiment, when providing route guidance, the terminal may broadcast the route guidance information in the form of voice, for example, broadcast "go straight ahead for 500 meters and then turn right" in the form of voice.

In the navigation method, the terminal obtains the route information of the target route corresponding to the target start point and the target end point, to obtain the route information set; where the target route corresponds to at least two sequential navigation scenarios. In this way, the terminal may obtain complete route information corresponding to multiple navigation scenarios at one time. Next, the terminal determines the target route information based on the route information set; and switches a navigation scenario based on the sequence corresponding to each navigation scenario, and provides route guidance in each navigation scenario according to route guidance information. Therefore, the terminal may automatically switch the navigation scenario in sequence to avoid time waste caused when the user initiates navigation for multiple times and switches navigation manually and improve navigation efficiency. The navigation method addresses the limitations of conventional navigation methods and systems that can only provide navigation for one navigation scenario at a time and that requires another input to obtain another navigation for another navigation scenario (e.g., different from the first navigation scenario). The navigation method eliminates those problems and provides a complete navigation for a route that involves multiple navigation scenarios.

Further, since the complete route information corresponding to multiple navigation scenarios may be obtained at one time, when the navigation scenario is switched in the navigation process, the route information does not need to be obtained from the server for multiple times, which not only improves the navigation efficiency, but also may save running memory resources of the terminal and service resources of the server because the number of requests of the terminal and the number of responses of the server are reduced.

In addition, because the route information does not need to be obtained from the server for multiple times, this can also avoid the failure of obtaining route information due to interference of a network signal and a GPS positioning status in a process of switching the navigation scenario, thereby improving navigation reliability.

In an embodiment, the switching a navigation scenario based on a sequence corresponding to each navigation scenario, and providing route guidance in each navigation scenario according to route guidance information includes: providing route guidance according to the route guidance information in a case that the current positioning point does not arrive at a navigation end point corresponding to a current navigation scenario; and switching to a next navigation scenario in a case that the current positioning point arrives at a navigation end point corresponding to a current navigation scenario and does not arrive at the target end point.

It may be understood that since the target route corresponds to at least two sequential navigation scenarios, each navigation scenario corresponds to a sub-route segment in the target route. It may be considered that the target route is formed by sequentially connecting sub-route segments corresponding to navigation scenarios.

The navigation end point corresponding to the current navigation scenario is an end point of a sub-route segment corresponding to the current navigation scenario. For example, a user needs to travel from a location A to a location C. A route is to first cycle from the location A to a location B and then walk from the location B to the location C. Included navigation scenarios include the cycling navigation scenario and the walking navigation scenario. A route segment corresponding to the cycling navigation scenario is a route segment from the location A to the location B, and the location B is a navigation end point of the cycling navigation scenario.

Specifically, in each navigation scenario, the terminal obtains a current positioning point of the user, and determines whether the current positioning point arrives at a navigation end point corresponding to a current navigation scenario. If the current positioning point does not arrive at the navigation end point corresponding to the current navigation scenario, the terminal continues to navigate in the current scenario. During navigation, the terminal provides route guidance for the user according to the route guidance information. If the current positioning point arrives at the navigation end point of the current navigation scenario, the terminal continues to determine whether the current positioning point arrives at the target end point, and if the current positioning point arrives at the navigation end point corresponding to the current navigation scenario and does not arrive at the target end point, the terminal switches the navigation scenario, that is, determines a next navigation scenario corresponding to the current navigation scenario as a current navigation scenario. As described in the above example, when the user arrives at the location B, the location B is the navigation end point of the cycling navigation scenario, but the location B is not the target end point (the target end point is the location C). In this case, the terminal switches the navigation scenario to the next navigation scenario, that is, the walking navigation scenario.

It may be understood that when the current positioning point arrives at the navigation end point of the current navigation scenario and arrives at the target end point, it means that the user arrives at the target end point, and the terminal ends the entire navigation.

In the above embodiment, by determining whether the current positioning point arrives at the navigation end point and the target end point, the terminal can accurately switch the navigation scenario.

In an embodiment, before the switching to a next navigation scenario in a case that the current positioning point arrives at a navigation end point corresponding to a current navigation scenario and does not arrive at the target end point, the method further includes: determining a current location point corresponding to the current positioning point on a route corresponding to the target route information; and determining, in a case that a linear distance between the current positioning point and the navigation end point does not exceed a first preset distance threshold and a route distance between the current location point and the navigation end point does not exceed a second preset distance threshold, that the current positioning point arrives at the navigation end point corresponding to the current navigation scenario.

The route corresponding to the target route information is a connection line of the string of longitude and latitude coordinate points in the target route information.

During navigation, the current positioning point of the user obtained by the terminal usually is not exactly on the route corresponding to the target route information. Therefore, the terminal needs to determine, according to the route corresponding to the target route information, the current location point corresponding to the current positioning point. The current location point corresponding to the current positioning point is a location point closest to the current positioning point on the route corresponding to the target route information. Specifically, the terminal may draw a vertical line from the current positioning point to each sub-route segment. Each vertical line and a sub-route segment have an intersection point, and an intersection point corresponding to a shortest vertical line is determined as the current location point corresponding to the current positioning point.

The distance from the current positioning point to the navigation end point determined by the terminal is usually a straight-line distance. However, in some cases, the user cannot arrive at the navigation end point in a straight line from the current positioning point, and may need to detour to arrive at the navigation end point. In this case, although the distance between the current positioning point of the user and the navigation end point does not exceed the preset threshold, the user still does not arrive at the navigation end point. To avoid premature ending of the navigation, after determining the current location point corresponding to the current positioning point, the terminal may simultaneously determine whether the linear distance between the current positioning point and the navigation end point exceeds the first preset distance threshold and whether the route distance between the current location point and the navigation end point exceeds the second preset distance threshold. Only when the distance between the current positioning point and the navigation end point does not exceed the first preset distance threshold and the distance between the current location point and the navigation end point does not exceed the second preset distance threshold, the terminal determines that the current positioning point arrives at the navigation end point corresponding to the current navigation scenario. The route distance is an actual distance between the current location point and the navigation end point on the route corresponding to the target route information. The first preset distance threshold and the second preset distance threshold may be preset according to actual needs.

In the above embodiment, by determining based on both the current positioning point and the current location point to determine whether the current positioning point arrives at the navigation end point corresponding to the navigation scenario, it can be accurately determined whether the user arrives at the navigation end point, avoiding that determining only based on the current positioning point causes premature ending of the navigation.

Figure 3:
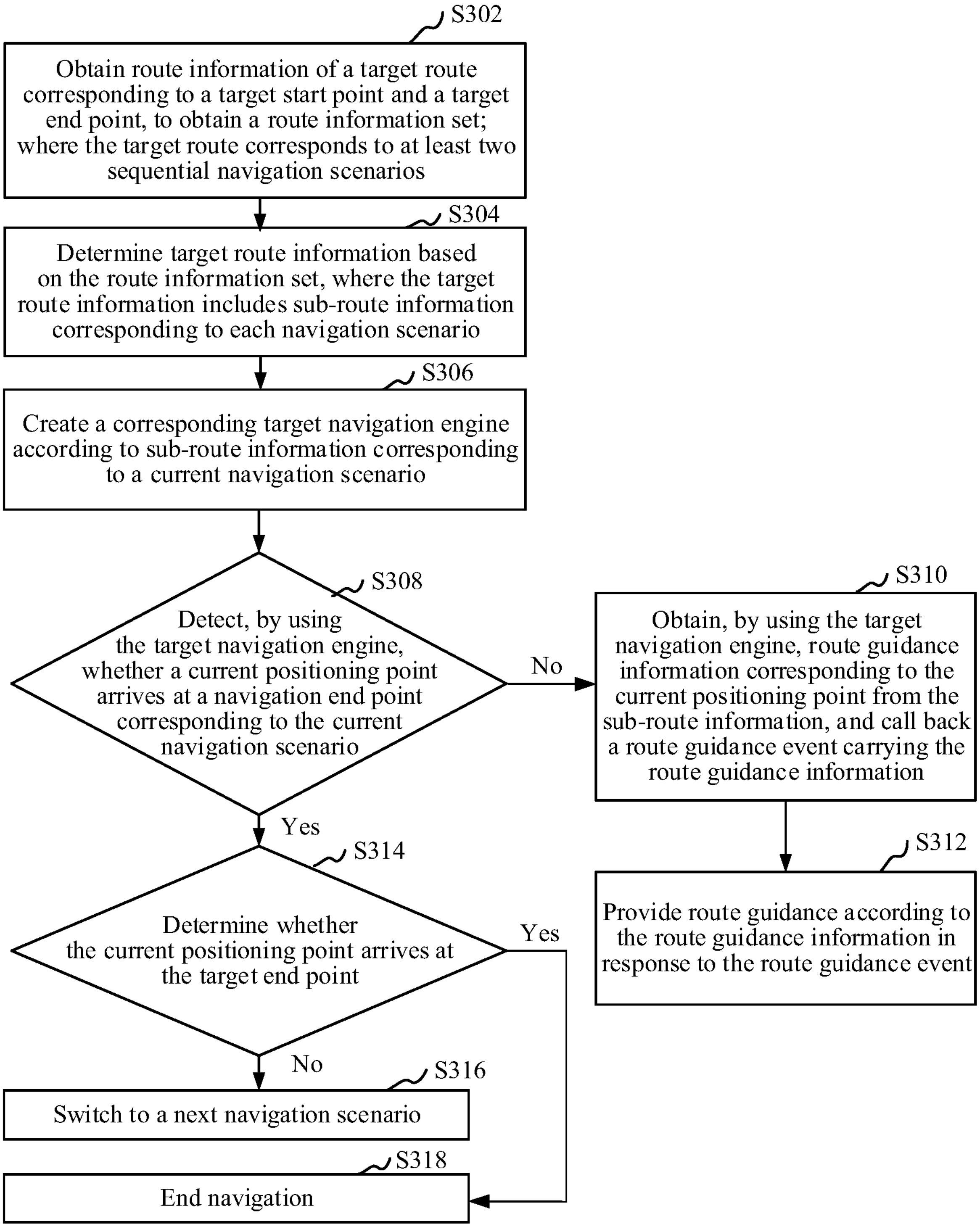
FIG. 3 is a schematic flowchart of a navigation method according to another embodiment.

In an embodiment, as shown in FIG. 3, a navigation method is provided, including the following operations:

Operation 302: Obtain route information of a target route corresponding to a target start point and a target end point, to obtain a route information set; where the target route corresponds to at least two sequential navigation scenarios.

Operation 304: Determine target route information based on the route information set, where the target route information includes sub-route information corresponding to each navigation scenario.

The sub-route information corresponding to the navigation scenario is route information of a sub-route segment corresponding to the navigation scenario.

Operation 306: Create a corresponding target navigation engine according to sub-route information corresponding to a current navigation scenario.

Operation 308: Detect, by using the target navigation engine, whether a current positioning point arrives at a navigation end point corresponding to the current navigation scenario; and if not, perform operation 310; or if yes, perform operation 314.

A navigation engine is a function library for driving navigation. Different navigation scenarios correspond to different navigation engines. The target navigation engine corresponding to the current navigation scenario is a navigation engine corresponding to the current navigation scenario and the target route information.

Specifically, the terminal first creates a navigation engine corresponding to the current navigation scenario, and initializes the created navigation engine according to the target route information to obtain the target navigation engine corresponding to the current scenario. In an initialization process, the navigation engine executes a corresponding initialization method. For example, during initialization of a walking navigation engine, the walking navigation engine executes an initialization method InitWalkEngineO. An object inputted in this method is array<mappoint>, that is, an array of mappoints. The mappoint object is encapsulated with information of each longitude and latitude coordinate point on the route, including a specific longitude and latitude, route guidance information, a navigation scenario identifier, and the like. The initialization method has no return value, and a processing result is mainly to store route information transferred through initialization.

Operation 310: Obtain, by using the target navigation engine, route guidance information corresponding to the current positioning point from the sub-route information, and call back a route guidance event carrying the route guidance information.

Specifically, when the current positioning point does not arrive at the navigation end point corresponding to the current navigation scenario, it means that the user is still in the current navigation scenario, and the target navigation engine corresponding to the current navigation scenario may perform navigation. Since the target navigation engine stores the route information and the route information includes route guidance information corresponding to each point on the route, the terminal may first determine, by using the target navigation engine, a current location point corresponding to the current positioning point on a route corresponding to the target route information, determine route guidance information corresponding to the current location point as route guidance information corresponding to the current positioning point, and call back the route guidance event by using the target navigation engine. The route guidance event carries determined route guidance information.

Operation 312: Provide route guidance according to the route guidance information in response to the route guidance event.

The terminal responds to the route guidance event, obtains the route guidance information by parsing the route guidance event, and provides route guidance for the user according to the route guidance information.

Operation 314: Determine whether the current positioning point arrives at the target end point; and if not, perform operation 316; or if yes, perform operation 318.

Operation 316: Switch to a next navigation scenario.

Operation 318: End the navigation.

In the above embodiment, the target navigation engine corresponding to the current navigation scenario is obtained, the target navigation engine detects whether the current positioning point arrives at the navigation end point, and when the current positioning point does not arrive at the navigation end point corresponding to the current navigation scenario, the route guidance event is called back to provide route guidance, thereby improving navigation accuracy and efficiency.

In an embodiment, the creating a corresponding target navigation engine according to sub-route information corresponding to a current navigation scenario includes: obtaining a navigation state set; where the navigation state set includes a state subset corresponding to each navigation scenario and the state subset corresponding to each navigation scenario includes a navigation sub-state corresponding to each navigation scenario; and determining a navigation sub-state corresponding to the current navigation scenario as a current control state to trigger the creation of a navigation engine corresponding to the current navigation scenario, and initializing the created navigation engine according to the sub-route information to obtain the target navigation engine corresponding to the current navigation scenario.

The navigation state set is a set consisting of multiple different navigation states. The navigation state set includes a state subset corresponding to each navigation scenario. The state subset corresponding to each navigation scenario includes multiple navigation states in the navigation scenario, and each navigation state is used to control calling of different navigation functions in the navigation scenario. The current control state is a navigation state currently in control. The terminal selects a navigation state from the navigation state set as the current control state each time to switch between different navigation states, so that calling of different navigation functions can be controlled.

In this embodiment, the terminal determines the navigation sub-state corresponding to the current navigation scenario as the current control state. In this case, the navigation sub-state is used to control calling of a corresponding navigation function and create a corresponding target navigation engine. After the navigation starts, the terminal needs to obtain the route guidance information by using the target navigation engine and call back the route guidance event. Therefore, in the navigation sub-state, the terminal is triggered to create a navigation engine corresponding to the current navigation scenario, and initialize the created navigation engine according to sub-route information corresponding to the current navigation scenario to obtain the target navigation engine corresponding to the current navigation scenario.

In an embodiment, the terminal may select and switch a navigation state through a navigation state machine. The navigation state machine is responsible for managing all navigation states in the navigation state set. The navigation state machine includes multiple sub-state machines. The sub-state machines are responsible for managing state subsets corresponding to different navigation scenarios and switching between different navigation states as required. After switching for each time, a state that is switched to is the current control state. After navigation starts, the navigation state machine switches a navigation state to a sub-state machine corresponding to a navigation scenario, and the sub-state machine controls switching of a navigation state in the navigation scenario. When the user arrives at a navigation end point of a navigation scenario, the navigation state machine switches a navigation state to a sub-state machine of a next navigation scenario, until the user finally arrives at the target end point.

In this embodiment, the navigation sub-state of the current navigation scenario is determined as the current control state, to obtain the target navigation engine of the current navigation scenario, so that route guidance may be provided in each navigation scenario by using a navigation engine corresponding to the navigation scenario, thereby ensuring navigation accuracy.

In an embodiment, the state subset corresponding to each navigation scenario includes an end sub-state corresponding to the navigation scenario; and the switching to a next navigation scenario in a case that the current positioning point arrives at a navigation end point corresponding to a current navigation scenario and does not arrive at the target end point includes: determining the end sub-state corresponding to the current navigation scenario as the current control state in a case that the current positioning point arrives at the navigation end point corresponding to the current navigation scenario and does not arrive at the target end point to trigger the end of the current navigation; and determining a navigation sub-state corresponding to the next navigation scenario as the current control state, to trigger the creation of a navigation engine corresponding to the next navigation scenario, and initializing the created navigation engine according to sub-route information corresponding to the next navigation scenario to obtain a target navigation engine corresponding to the next navigation scenario.

In this embodiment, when the current positioning point arrives at the navigation end point corresponding to the current navigation scenario and does not arrive at the target end point, it means that the route corresponding to the current navigation scenario has ended and the user does not arrive at the target end point. In this case, the terminal may determine the end sub-state corresponding to the current navigation scenario as the current control state. In the end sub-state, the target navigation engine corresponding to the current navigation scenario is destroyed. In this case, the current navigation scenario ends, and the terminal determines the navigation sub-state corresponding to the next navigation scenario as the current control state. In the navigation sub-state, the terminal initializes, according to the sub-route information corresponding to the next navigation scenario, the created navigation engine corresponding to the next navigation scenario, to obtain the target navigation engine corresponding to the next navigation scenario. After the target navigation engine corresponding to the next navigation scenario is created, it means that the terminal may enter the next navigation scenario to continue navigation, thereby implementing switching of the navigation scenario.

In this embodiment, navigation sub-states of different navigation scenarios are determined as the current control state, to implement automatic switching of different navigation scenarios, and during switching of the navigation scenario, the navigation engine corresponding to the current navigation scenario is destroyed, so that only one navigation engine works in a navigation scenario. Therefore, the terminal may accurately switch the navigation scenario, and memory waste caused by an unnecessary navigation engine can be avoided.

In an embodiment, the navigation state set further includes an end state; and the navigation method further includes: determining the end state as the current control state in a case that the current positioning point arrives at the target end point, to trigger the end of the entire navigation.

It may be understood that when the user arrives at the target end point, the navigation automatically ends, and the navigation state set then may include an end state. When determining that the current positioning point arrives at the target end point, the terminal may determine the end state as the current control state. In the end state, all navigation engines are destroyed, and the terminal ends the entire navigation process.

In an embodiment, the terminal may switch the navigation state to the end state through the navigation state machine, to determine the end state as the current control state.

In an embodiment, the navigation state set further includes an end state; and the method further includes: determining the end state as the current control state in a case that a navigation end request is received, to trigger the end of navigation.

It may be understood that in the navigation process, the user sometimes needs to end the navigation earlier. In this case, the terminal may determine the end state as the current control state when receiving the navigation end request triggered by the user. In this case, regardless of which navigation engine is working and whether the user arrives at the navigation end point of the current navigation scenario, the terminal destroys the navigation engine and ends the entire navigation process.

In an embodiment, the state subset corresponding to each navigation scenario includes a yaw state corresponding to the navigation scenario; and the navigation method further includes: determining the yaw state corresponding to the current navigation scenario as the current control state in a case that the current positioning point yaws from a route corresponding to the current navigation scenario, to trigger to obtain route re-planning information that has the current positioning point as a start point and the navigation end point as an end point and that corresponds to the current navigation scenario; and determining the navigation sub-state corresponding to the current navigation scenario as the current control state again after the route re-planning information is obtained, to trigger the update of the target navigation engine according to the route re-planning information.

The route corresponding to the current navigation scenario is a route formed according to the sub-route information corresponding to the current navigation scenario.

It may be understood that in the navigation process, the user may yaw from the navigation route for various reasons. In this case, the positioning point obtained by the terminal also yaws from the route corresponding to the target route information, accurate navigation cannot be provided according to the original route, and the current positioning point of the user needs to be used as a start point to re-plan a route. Therefore, the state subset corresponding to each navigation scenario further includes a yaw state corresponding to the navigation scenario. The terminal determines the yaw state corresponding to the current navigation scenario as the current control state in a case that the current positioning point yaws from a route corresponding to the current navigation scenario. In the yaw state, the terminal may be triggered to obtain route re-planning information that has the current positioning point as a start point and the navigation end point corresponding to the current navigation scenario as an end point and that corresponds to the current navigation scenario. After obtaining the route re-planning information, the terminal may start normal navigation again according to the route re-planning information. Then, the terminal may determine the navigation sub-state corresponding to the current navigation scenario as the current control state again. The navigation sub-state triggers the terminal to re-initialize the target navigation engine according to the route re-planning information, to update the target navigation engine. The updated target navigation engine may continue to provide navigation according to the positioning point of the user and the route re-planning information. For a specific process of obtaining the route re-planning information by the terminal, refer to the process of obtaining the route planning information by the terminal in the above embodiment.

In an embodiment, the terminal may switch the navigation state in the current navigation scenario to the yaw state through a sub-state machine corresponding to the current navigation scenario, to determine the yaw state corresponding to the current navigation scenario as the current control state. Further, after obtaining the route re-planning information, the terminal may switch, through the sub-state machine corresponding to the current navigation scenario, the navigation state in the current navigation scenario to the navigation sub-state corresponding to the current navigation scenario again, to determine the navigation sub-state corresponding to the current navigation scenario as the current control state again.

In this embodiment, the yaw state corresponding to the current navigation scenario is determined as the current control state, so that when the user yaws from the route, route re-planning may be performed, thereby ensuring navigation accuracy.

In an embodiment, the target navigation engine is further configured to call back, in a case that the current positioning point yaws from a route corresponding to the current navigation scenario, a yaw event carrying the current positioning point; and the determining the yaw state corresponding to the current navigation scenario as the current control state in a case that the current positioning point yaws from a route corresponding to the current navigation scenario includes: determining the yaw state corresponding to the current navigation scenario as the current control state in response to the yaw event in a case that the current positioning point yaws from the route corresponding to the current navigation scenario.

Specifically, the terminal may determine, by using the target navigation engine, whether the current positioning point yaws from the route corresponding to the current navigation scenario, and call back, by using the target navigation engine in the case that the current positioning point yaws from the route corresponding to the current navigation scenario, the yaw event carrying the current positioning point. The terminal further determines the yaw state corresponding to the current navigation scenario as the current control state in response to the yaw event, to call the navigation function in the yaw state. Since the target navigation engine is obtained through initialization according to the sub-route information of the current navigation scenario, it can be accurately determined, by using the target navigation engine, whether the current positioning point yaws from the route corresponding to the current navigation scenario. Therefore, the yaw state corresponding to the current navigation scenario is determined as the current control state in response to the yaw event called back by using the target navigation engine, so that when the user yaws from the route, the terminal can accurately switch to the yaw state. The navigation function in the yaw state is called, to accurately guide the user when the user yaws.

In an embodiment, the target navigation engine is further configured to: respectively obtain location points of a preset number of consecutive positioning points up to the current positioning point on the route corresponding to the current navigation scenario; and determine, in a case that distances between the preset number of consecutive positioning points up to the current positioning point and corresponding location points all exceed a third preset distance threshold, that the current positioning point deviates from the route corresponding to the current navigation scenario; or determine, in a case that angles between directions of routes corresponding to the preset number of consecutive positioning points up to the current positioning point and directions of routes of location points exceed a preset angle threshold, that the current positioning point deviates from the route corresponding to the current navigation scenario.

The preset number of consecutive positioning points up to the current positioning point include the current positioning point and several history positioning points that are continuous with the current positioning point. For example, when the preset number is 8, the preset number of consecutive positioning points up to the current positioning point include the current positioning point and 7 history positioning points that are continuous with the current positioning point. The location point of the positioning point on the route corresponding to the current navigation scenario is a location point closest to the positioning point on the route corresponding to the current navigation scenario. For determining of the location point, refer to the description in the above embodiments. The route segment corresponding to the preset number of consecutive positioning points up to the current positioning point is a route segment obtained by connecting these positioning points.

The current positioning point yaws from the route corresponding to the current navigation scenario in at least two cases: distance yaw, that is, a travel route of the user becomes farther and farther from the navigation route (that is, the route corresponding to the current navigation scenario); or angle yaw, that is, an angle between a direction of the travel route of the user and a direction of the navigation route becomes larger and larger, and the user may go back.

Specifically, in the case of distance yaw, the terminal may determine, by using the target navigation engine, whether distances between the current positioning point and these history positioning points and corresponding location points all exceed the third preset distance threshold; and if yes, determine that the current positioning point yaws from the route corresponding to the current navigation scenario. In the case of angle yaw, the terminal may determine, by using the target navigation engine, whether angles between directions of route segments corresponding to the current positioning point and these history positioning points and directions of route segments of location points exceed the preset angle threshold; and if yes, determine that the current positioning point yaws from the route corresponding to the current navigation scenario. It may be understood that a direction of a route segment herein is a travel direction of the user in the route segment, and may be uniquely determined.

In an embodiment, when the current navigation scenario is a walking navigation scenario, the terminal may also determine, by using the target navigation engine, whether the preset number of consecutive positioning points up to the current positioning point are on the same floor as the locations points corresponding to these positioning points; and when none of these positioning points is on the same floor as the corresponding location point, determine that the current positioning point yaws from the route corresponding to the current navigation scenario.

In an embodiment, before the providing route guidance according to the route guidance information, the navigation method further includes: obtaining current positioning information and history positioning information; and determining a positioning point in the current positioning information as the current positioning point in a case of determining that the current positioning information satisfies a preset condition according to the history positioning information.

Specifically, in the navigation process, the terminal continuously obtains current positioning information of the user. Under a normal circumstance, multiple pieces of positioning information obtained by the terminal usually conform to a particular rule, but sometimes incorrect positioning information may be obtained due to a weak GPS signal and other reasons. These pieces of incorrect positioning information cannot reflect a current location of the user. In this case, the terminal may filter out these pieces of incorrect positioning information based on history positioning information, to obtain correct positioning information. In this embodiment of the disclosure, the preset condition is specified, and the terminal may determine whether the current positioning information meets the preset condition according to the history positioning information, and only when the current positioning information meets the preset condition, consider that the obtained current positioning information is correct, and determine the positioning point in the correct current positioning information as the current positioning point. The preset condition is specified as required, as long as the specified preset condition may reflect that multiple pieces of positioning information conform to a particular rule.

The walking navigation scenario is used as an example. The preset condition may be that a distance between a positioning point in the current positioning information and a positioning point in the history positioning information does not exceed a preset threshold. For example, in the walking navigation scenario, when a distance between the positioning point in the current positioning information and a positioning point in positioning information obtained for the last time does not exceed 8 m, it is determined that the current positioning information is correct positioning information. The preset condition may also be that the current positioning information and previous several pieces of positioning information indicate a same spatial region. For example, when the previous pieces of positioning information all indicate indoors, if the current positioning information indicates outdoors, it is determined that the current positioning information is incorrect positioning information. For another example, when the previous pieces of positioning information all indicate the first floor, if the current positioning information indicates another floor, it is determined that the current positioning information is incorrect positioning information.

In this embodiment, the terminal may filter out incorrect current positioning information according to history positioning information, to prevent the incorrect positioning information from affecting navigation accuracy.

In an embodiment, after the determining target route information based on the route information set; the navigation method further includes: controlling a current display interface to display a corresponding target route according to the target route information; and the providing route guidance according to the route guidance information includes: controlling the current display interface to display the route guidance information.

Specifically, the current display interface is an interface that may display a map. After determining the target route information, the terminal may control the current display interface to display the corresponding target route according to the target route information, and control the current display interface to display the route guidance information in each navigation scenario. In this way, navigation guidance is visually intuitively provided for the user, and navigation efficiency is improved.

In a specific embodiment, a navigation method is provided, including the following operations:

1. Obtain route information of a target route corresponding to a target start point and a target end point, to obtain a route information set, where the target route corresponds to at least two sequential navigation scenarios.
2. Determine target route information based on the route information set, where the target route information includes sub-route information corresponding to each navigation scenario.

3. Control a current display interface to display a corresponding target route according to the target route information.
4. Obtain a navigation state set, where the navigation state set includes a state subset corresponding to each navigation scenario, and the state subset corresponding to each navigation scenario includes a navigation sub-state corresponding to each navigation scenario.

The navigation state set further includes an end state, and the state subset corresponding to each navigation scenario includes a yaw state and an end sub-state corresponding to the navigation scenario.

5. Determine a navigation sub-state corresponding to the current navigation scenario as a current control state, to trigger the creation of a navigation engine corresponding to the current navigation scenario, and initialize the created navigation engine according to the sub-route information to obtain the target navigation engine corresponding to the current navigation scenario.
6. Detect, by using the target navigation engine, whether a current positioning point arrives at a navigation end point corresponding to the current navigation scenario.
7. When the current positioning point does not arrive at the navigation end point corresponding to the current navigation scenario, obtain route guidance information corresponding to the current positioning point from the sub-route information by using the target navigation engine, and call back a route guidance event carrying the route guidance information.
8. Provide route guidance according to the route guidance information in response to the route guidance event.

Specifically, during route guidance, the current display interface is controlled to display the route guidance information.

9. Determine, by using the target navigation engine, whether the current positioning point yaws from a route corresponding to the current navigation scenario; and call back, in a case that the current positioning point yaws from the route corresponding to the current navigation scenario, a yaw event carrying the current positioning point.
10. Determine the yaw state corresponding to the current navigation scenario as the current control state in response to the yaw event, to trigger to obtain route re-planning information that has the current positioning point as a start point and the navigation end point as an end point and that corresponds to the current navigation scenario.
11. Determine the navigation sub-state corresponding to the current navigation scenario as the current control state again after the route re-planning information is obtained, to trigger the update of the target navigation engine according to the route re-planning information.
12. Determine an end sub-state corresponding to the current navigation scenario as the current control state, in a case that the current positioning point arrives at the navigation end point corresponding to the current navigation scenario and does not arrive at the target end point, to trigger the end of the current navigation.
13. Determine a navigation sub-state corresponding to the next navigation scenario as the current control state to trigger the creation of a navigation engine corresponding to the next navigation scenario, and initialize the created navigation engine according to sub-route information corresponding to the next navigation scenario to obtain a target navigation engine corresponding to the next navigation scenario.
14. Determine the end state as the current control state, in a case that the current positioning point arrives at the target end point, to trigger the end of the entire navigation.

In a specific embodiment, computer-readable instructions corresponding to the navigation method provided in the embodiments of the disclosure may be encapsulated as a navigation software development kit (SDK). The terminal is installed with navigation application software developed based on the navigation SDK to implement the navigation method provided in the disclosure.

Figure 4:
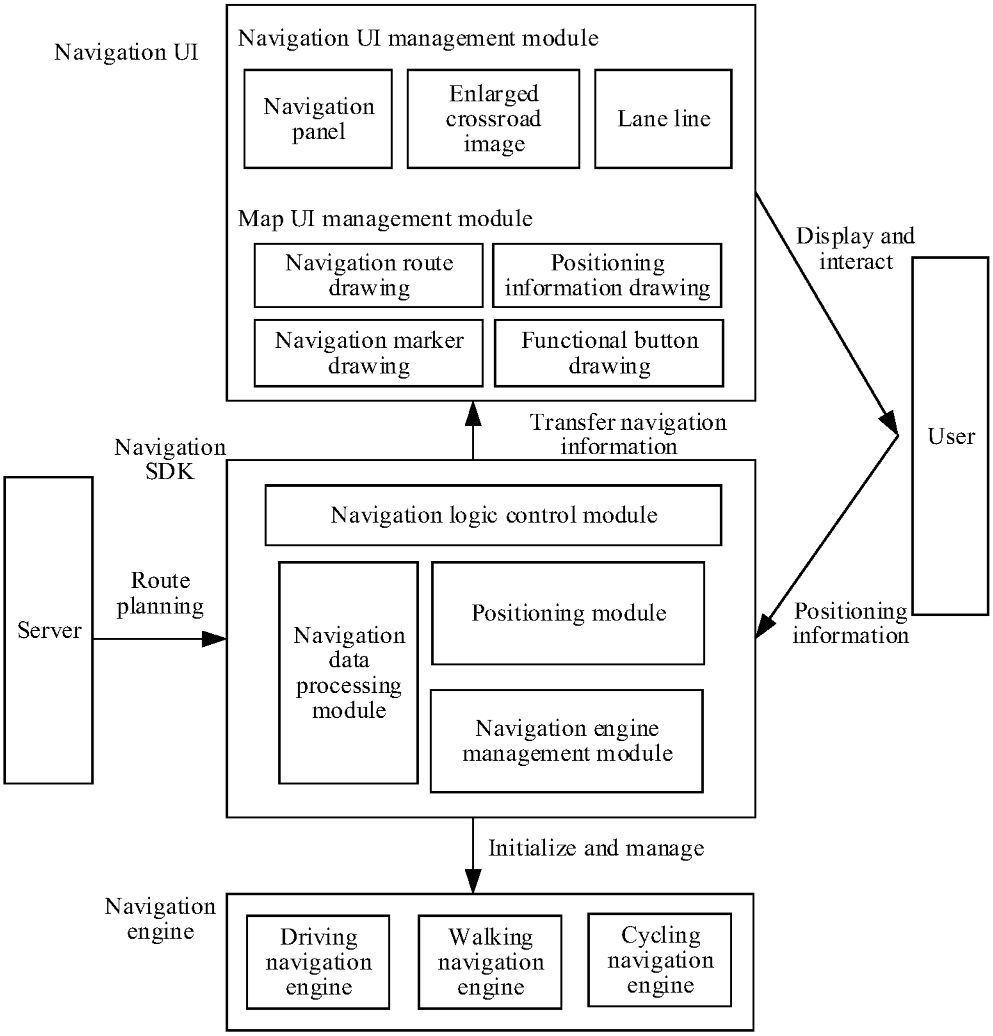
FIG. 4 is a diagram of a technical framework corresponding to a navigation method according to an embodiment.

FIG. 4 is a diagram of a technical framework corresponding to a navigation method provided in the disclosure according to a specific embodiment. In this embodiment, the navigation application software of the terminal may be integrated with three parts: a navigation SDK, a navigation user interface (UI), and a navigation engine, to implement the navigation method of the disclosure.

Referring to FIG. 4, the navigation SDK mainly includes a navigation data processing module, a navigation logic control module, a navigation engine management module, and a positioning module. The navigation data processing module functions at a route planning stage before navigation starts, while the other three modules function in the entire navigation process. From the route planning stage to the start of navigation, main functions and specific processes of the modules of the navigation SDK are as follows:

(1) After route information returned by a server according to a route planning request is transferred to the navigation data processing module, the module parses and encapsulates the route information. In this case, the encapsulated route information is transferred to the navigation UI to draw a route on a map and display the route to the user. After the navigation starts, the route information is transferred to the navigation engine to initialize the navigation engine.

(2) After the navigation starts, the navigation logic control module serves as a general controller and is responsible for all navigation events and navigation functions, including notifying the navigation engine management module to initialize the engine, and starting the positioning module to obtain real-time positioning information of the user. The navigation logic control module switches a navigation state through a navigation state machine.

Figure 5:
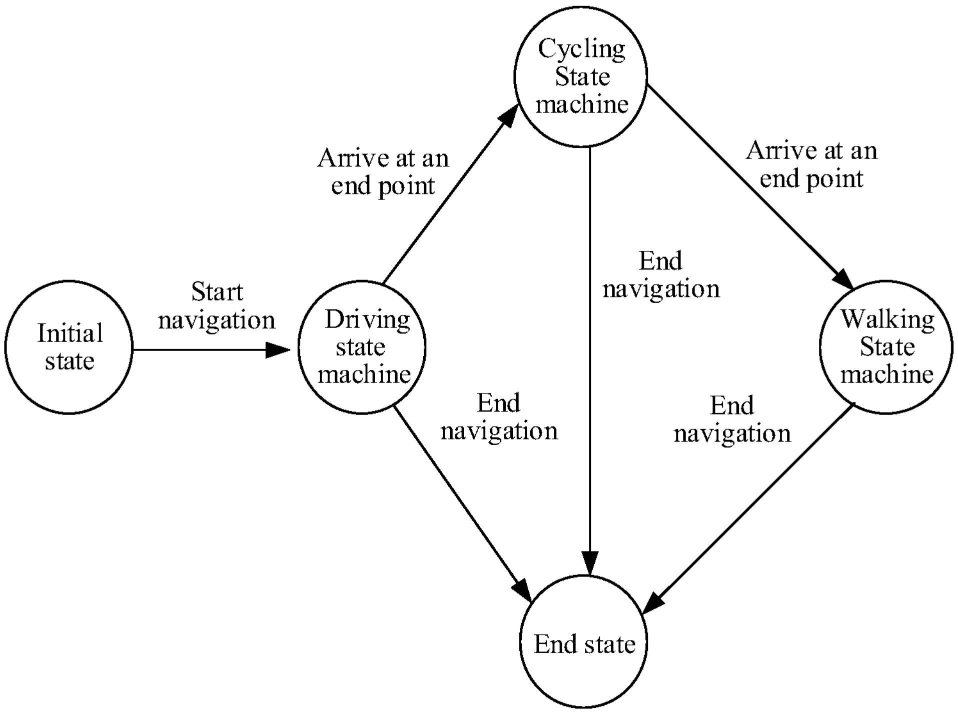
FIG. 5 is a schematic diagram of controlling switching of a navigation state by a navigation state machine according to an embodiment.

FIG. 5 is a schematic diagram of controlling switching of a navigation state by a navigation state machine according to an embodiment. Referring to FIG. 5, the navigation state machine includes three sub-state machines: a driving state machine, a walking state machine, and a cycling state machine. The three sub-state machines correspond to the driving navigation scenario, the walking navigation scenario, and the cycling navigation scenario respectively. Before the navigation starts, the navigation state is an initial state. After the navigation starts, the navigation state machine switches to the driving state machine, that is, in current travel, the first navigation scenario is the driving navigation scenario. When the user arrives at an end point of the driving navigation scenario, the navigation state machine switches to the cycling state machine. When the user arrives at a navigation end point of the cycling navigation scenario, the navigation state machine switches to the walking state machine. In each navigation scenario, the state of the navigation state machine may switch to the end state. The end state marks the end of the navigation.

Figure 6:
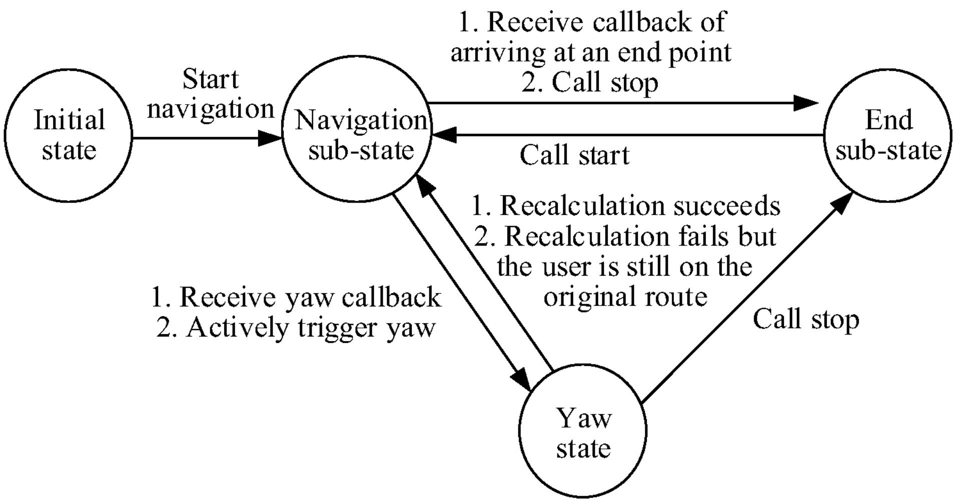
FIG. 6 is a schematic diagram of controlling switching of a navigation state by a state sub-machine according to an embodiment.

FIG. 6 is a schematic diagram of controlling switching of a navigation state by a state sub-machine according to an embodiment. In this embodiment, each state subset includes an initial state, a navigation sub-state, an end sub-state, and a yaw state. Referring to FIG. 6, when the navigation state is the initial state, a navigation state in each state subset is the initial state. After the navigation starts in each navigation scenario, a sub-state machine corresponding to the navigation scenario controls the navigation state to switch from the initial state to the navigation sub-state. Among the navigation states in the state subset, the sub-state machine may control switching between the navigation sub-state and the end sub-state and switching between the navigation sub-state and the yaw state, and control the yaw state to switch to the end sub-state.

Specifically, when the navigation SDK receives yaw callback or the user actively triggers yaw, the sub-state machine may switch the navigation sub-state to the yaw state. When recalculation succeeds or recalculation fails but the user is still on the original route, the sub-state machine may switch the yaw state to the navigation sub-state. The recalculation herein refers to route re-planning according to the current positioning point of the user when the user yaws from the route.

In the yaw state, the sub-state machine switches to the end sub-state by calling the stop function. For example, in a navigation process of a navigation scenario, the user yaws from the route. In this case, the user may manually end the navigation, and the sub-state machine switches to the end sub-state by calling the stop function.

In the end sub-state, the sub-state machine may switch to the navigation sub-state by calling the start function. For example, when the navigation of a navigation scenario ends, the user re-initiates the navigation in the navigation scenario, and in this case, the sub-state machine may switch to the navigation sub-state by calling the start function.

In the navigation sub-state, when receiving a callback event indicating that the user arrives at an end point, the navigation SDK may switch the navigation sub-state to the end sub-state through the sub-state machine; or the navigation SDK may directly call the stop function through the sub-state machine to switch the navigation sub-state to the end sub-state. For example, in a navigation process of a navigation scenario, the user actively clicks on "end the navigation". In this case, the navigation SDK may directly call the stop function through the sub-state machine to switch the navigation state of the navigation scenario from the navigation sub-state to the end sub-state.

(3) When the navigation starts, the navigation engine management module creates a required navigation engine according to the route information encapsulated by the navigation data processing module. At the same time, the positioning module obtains positioning information of the user in real time and transfers the positioning information to the navigation engine through the navigation engine management module.

(4) In the navigation process, the navigation engine calls back events such as route guidance and yaw prompt in real time. The navigation engine management module is responsible for responding to the events and informing the user of the events by transferring the events to the navigation UI through the navigation logic control module.

(5) When the navigation arrives at a destination, the navigation logic control module displays this to the user through the navigation UI and stops the navigation, mainly including stopping functions of all navigation SDK modules, destroying the created navigation engine, or the like.

Referring to FIG. 4, the navigation engine includes a driving engine, a cycling engine, and a walking engine. Each navigation engine includes functions such as positioning point filtering, route binding, yaw determining, and arrival determining. Functions function basically similarly in different engines.

The function corresponding to positioning point filtering is used to filter out the incorrect positioning information mentioned above. The function mainly filters out a positioning point according to a distance between positioning points corresponding to multiple pieces of positioning information. For the walking navigation engine, the function also performs filtering according to an indoor or outdoor status and a floor status of a positioning point. The function corresponding to positioning point filtering is mainly bool FilterPoint (GPSPoint), and needs to process the positioning information of the user. A return value is Boolean, and a processing result is whether positioning information is to be filtered out. GPSPoint is a positioning information type of the user, mainly including a longitude and a latitude, indoor or outdoor information, and the like.

The function corresponding to route binding is used to bind a positioning point obtained after filtering with a route corresponding to the route information transferred when the navigation engine is initialized, and return the point bound with the route. Specifically, a binding process is determining the current location point corresponding to the current positioning point on the route corresponding to the route information mentioned above. The function corresponding to route binding is mainly MapPoint BindToMapPoint (GPSPoint). The function needs to process a positioning point that is not filtered out in positioning point filtering in the last operation, and a processing result is to return a location point bound to the route.

The function corresponding to yaw determining is used to determine a yaw event when the current positioning point of the user yaws from a route corresponding to a current navigation scenario (that is, a navigation route), and return the yaw event to the navigation SDK. Yaw determining is determining whether the current positioning point yaws from the navigation route mentioned above. For a specific determining method, refer to the description in the above embodiment. Details are not repeated herein in the disclosure.

The function corresponding to yaw determining is mainly bool CheckYaw (GPSPoint). The function needs to process a positioning point that is not filtered out in positioning point filtering in the operation before the last operation, and a processing result is whether the current positioning point triggers yaw.

The function corresponding to arrival determining is used to determine whether the current positioning point arrives at a navigation end point corresponding to the current navigation scenario, and if yes, return an arrival event to the navigation SDK. The function corresponding to arrival determining is mainly bool CheckArrival (MapPoint). The function needs to process a positioning point bound to the route, and a processing result is whether the user arrives at a destination.

Referring to FIG. 4, the navigation UI mainly includes a map UI management module and a navigation UI management module. The map UI management module is integrated with a map SDK, mainly including drawing and displaying map elements, for example, a navigation route, navigation markers such as door and elevator POIs, a functional button such as switching a navigation scenario, and positioning information.

The navigation UI management module includes a navigation panel, a lane line, an enlarged crossroad image, and the like. The navigation UI management module displays navigation guidance information such as a navigation arrow and a road name according to a route guidance callback event of the navigation SDK.

Figure 7:
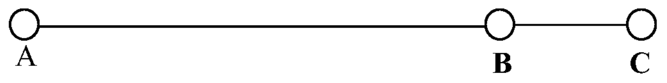
FIG. 7 is a schematic diagram of a route of a user according to an embodiment.

The following describes a working procedure of each module in this embodiment with a specific example. FIG. 7 is a schematic diagram of a route of a user in a specific scenario. In the scenario, the user navigates from a point A to an end point C. The segment A to B is the cycling navigation scenario, and the segment B to C is the walking navigation scenario.

1. The user enters a target start point A and a target end point C on a UI interface, and sends the target start point A and the target end point C to the server through the navigation logic control module. The server performs route planning to obtain two target routes: a route 1: A-B-C, where A to B is cycling and B to C is walking; and a route 2: A-D-C, where A to D is driving and D to C is walking.
2. The server transmits route information of the two target routes to the navigation data processing module. After parsing and encapsulating the route information, the navigation data processing module transmits the route information to the navigation logic control module for storage, where the navigation state herein is the initial state.
3. The navigation logic control module transmits the route information to the UI interface for display.
4. The user selects the route 1 and clicks on the “start navigation” button to trigger the navigation. In this case, the UI interface transmits a selection result of the user to the navigation logic control module.
5. The navigation logic control module determines a corresponding navigation scenario as cycling navigation according to sub-route information corresponding to the segment A to B in the route 1, switches, through a cycling state machine, a navigation state from the initial state to a navigation state in a state subset corresponding to the cycling navigation sub-scenario, and triggers the navigation engine management module to create a cycling navigation engine and initialize the cycling navigation engine according to sub-route information corresponding to the segment A to B. At the same time, the navigation logic control module drives the positioning module to start obtaining the positioning information of the user.
6. In a navigation process of the segment A to B, the positioning module constantly obtains positioning information of the user and transmits the positioning information to the navigation engine management module. The navigation engine management module encapsulates the positioning information and transmits the positioning information to the cycling navigation engine for processing.
7. The cycling navigation engine determines route guidance information based on the sub-route information corresponding to the segment A to B according to the positioning information, and transmits the route guidance information to the navigation engine management module.
8. The navigation engine management module transmits the route guidance information to the navigation logic control module.
9. The navigation logic control module transmits the route guidance information to the UI interface to display the route guidance information to the user.
10. In the segment A to B, the cycling navigation engine determines that the user deviates and calls back a deviation event to the navigation engine management module.
11. The navigation engine management module transmits the deviation event to the navigation logic control module. The navigation logic control module switches, through the cycling state machine, the navigation state to a deviation state in the state subset corresponding to the cycling navigation scenario, and triggers route re-planning with the current location point as a start point and the target end point as an end point in the current navigation scenario, to obtain new route planning information. After obtaining the new route planning information, the navigation logic control module switches, through the cycling state machine, the navigation state back to the navigation sub-state in the state subset corresponding to the cycling navigation scenario.
12. When the user arrives at the location B, the cycling navigation engine determines that the user arrives at the navigation end point of the cycling navigation scenario, and calls back an arrival event to the navigation engine management module. The navigation engine management module transmits the arrival event to the navigation logic control module. The navigation logic control module switches, through the cycling state machine, the navigation state to the end sub-state in the state subset corresponding to the cycling navigation scenario, and triggers the navigation engine management module to destroy the created cycling navigation engine.
13. The navigation logic control module determines that the user currently does not arrive at the target end point, continues to determine the current navigation scenario as walking navigation according to sub-route information corresponding to the segment B to C, switches, through a walking state machine, the navigation state to a navigation sub-state in a state subset corresponding to the walking navigation scenario, and triggers the navigation engine management module to create a walking navigation engine and initialize the walking navigation engine according to sub-route information corresponding to the segment B to C. At the same time, the navigation logic control module drives the positioning module to start obtaining positioning information of the user.
14. For a navigation process in the segment B to C, refer to the navigation process in the segment A to B. Details are not repeated herein in this embodiment.
15. When the user arrives at the location B, the walking navigation engine determines that the user arrives at a navigation end point of the walking navigation scenario, and calls back an arrival event to the navigation engine management module. The navigation engine management module transmits the arrival event to the navigation logic control module. The navigation logic control module switches, through the walking state machine, the navigation state to an end sub-state in the state subset corresponding to the walking navigation scenario, and triggers the navigation engine management module to destroy the created walking navigation engine.

16. The navigation logic control module determines that the user currently arrives at the target end point, and switches the navigation state to the end state through the navigation state machine to end the entire navigation.

It is to be understood that, although each operation of the flowcharts in FIG. 2A and FIG. 3 is displayed sequentially according to arrows, the operations are not necessarily performed according to an order indicated by arrows. Unless clearly specified in this specification, there is no strict sequence limitation on the execution of the operations, and the operations may be performed in another sequence. In addition, at least some operations in FIG. 2A and FIG. 3 may include a plurality of operations or a plurality of stages, and these operations or stages are not necessarily performed at a same time instant, and may be performed at different time instants. The operations or stages are not necessarily performed in sequence, and the operations or stages may be performed alternately with at least some of other operations or stages of other operations.

Figure 8:
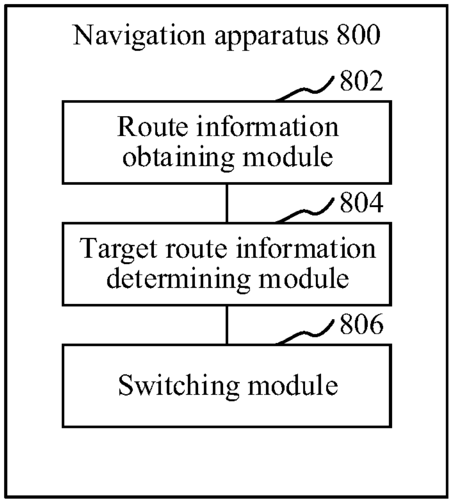
FIG. 8 is a structural block diagram of a navigation apparatus according to an embodiment.

In an embodiment, as shown in FIG. 8, a navigation apparatus 800 is provided. The apparatus may use a software module or a hardware module or a combination thereof and becomes a part of a computer device. The apparatus specifically includes:

a route information obtaining module 802, configured to obtain route information of a target route corresponding to a target start point and a target end point, to obtain a route information set; where the target route corresponds to at least two sequential navigation scenarios;

a target route information determining module 804, configured to determine target route information based on the route information set; and a switching module 806, configured to switch a navigation scenario based on a sequence corresponding to each navigation scenario, and provide route guidance in each navigation scenario according to route guidance information; where the route guidance information is determined according to a current positioning point and the target route information.

In an embodiment, the switching module is further configured to: provide route guidance according to the route guidance information in a case that the current positioning point does not reach a navigation end point corresponding to a current navigation scenario; and switch to a next navigation scenario in a case that the current positioning point arrives at a navigation end point corresponding to a current navigation scenario and does not reach the target end point.

In an embodiment, the apparatus further includes: an arrival determining module, configured to: determine a current location point corresponding to the current positioning point on a route corresponding to the target route information; and determine, in a case that a linear distance between the current positioning point and the navigation end point does not exceed a first preset distance threshold and a route distance between the current location point and the navigation end point does not exceed a second preset distance threshold, that the current positioning point arrives at the navigation end point corresponding to the current navigation scenario.

In an embodiment, the target route information includes sub-route information corresponding to each navigation scenario. The apparatus further includes: an engine creation module, configured to create a corresponding target navigation engine according to sub-route information corresponding to a current navigation scenario. The target navigation engine is configured to: when the current positioning point does not arrive at the navigation end point corresponding to the current navigation scenario, obtain route guidance information corresponding to the current positioning point from the sub-route information, and call back a route guidance event carrying the route guidance information. The switching module is further configured to provide route guidance according to the route guidance information in response to the route guidance event in a case that the current positioning point does not arrive at the navigation end point corresponding to the current navigation scenario.

In an embodiment, the engine creation module is further configured to: obtain a navigation state set; where the navigation state set includes a state subset corresponding to each navigation scenario; and the state subset corresponding to each navigation scenario includes a navigation sub-state corresponding to each navigation scenario; and determine a navigation sub-state corresponding to the current navigation scenario as a current control state, to trigger the creation of a navigation engine corresponding to the current navigation scenario, and initialize the created navigation engine according to the sub-route information to obtain the target navigation engine corresponding to the current navigation scenario.

In an embodiment, the navigation state set further includes an end state; and the apparatus further includes a first end module, configured to determine the end state as the current control state in a case that the current positioning point arrives at the target end point to trigger the end of the entire navigation.

In an embodiment, the navigation state set further includes an end state; and the apparatus further includes a second end module configured to determine the end state as the current control state in a case that a navigation end request is received to trigger the end of navigation.

In an embodiment, the state subset corresponding to each navigation scenario includes an end sub-state corresponding to the navigation scenario; and the switching module is further configured to determine an end sub-state corresponding to the current navigation scenario as the current control state in a case that the current positioning point arrives at the navigation end point corresponding to the current navigation scenario and does not reach the target end point to trigger the end of the current navigation.

In an embodiment, the switching module is further configured to: determine a navigation sub-state corresponding to the next navigation scenario as the current control state, to trigger the creation of a navigation engine corresponding to the next navigation scenario, and initialize the created navigation engine according to sub-route information corresponding to the next navigation scenario to obtain a target navigation engine corresponding to the next navigation scenario.

In an embodiment, the state subset corresponding to each navigation scenario includes a deviation state corresponding to the navigation scenario; and the apparatus further includes: a yaw processing module, configured to: determine the deviation state corresponding to the current navigation scenario as the current control state in a case that the current positioning point deviates from a route corresponding to the current navigation scenario, to trigger to obtain route re-planning information that has the current positioning point as a start point and the navigation end point as an end point and that corresponds to the current navigation scenario; and determine the navigation sub-state corresponding to the current navigation scenario as the current control state again after the route re-planning information is obtained to trigger the update of the target navigation engine according to the route re-planning information.

In an embodiment, the target navigation engine is further configured to call back, in a case that the current positioning point deviates from a route corresponding to the current navigation scenario, a deviation event carrying the current positioning point; and the yaw processing module is further configured to determine the deviation state corresponding to the current navigation scenario as the current control state in response to the deviation event in a case that the current positioning point deviates from the route corresponding to the current navigation scenario.

In an embodiment, the target navigation engine is further configured to: respectively obtain location points of a preset number of consecutive positioning points up to the current positioning point on the route corresponding to the current navigation scenario; and determine, in a case that distances between the preset number of consecutive positioning points up to the current positioning point and corresponding location points all exceed a third preset distance threshold, that the current positioning point deviates from the route corresponding to the current navigation scenario; or determine, in a case that an angle between route segments corresponding to the preset number of consecutive positioning points up to the current positioning point and route segments of location points exceed a preset angle threshold, that the current positioning point deviates from the route corresponding to the current navigation scenario.

In an embodiment, the apparatus further includes: a positioning point determining module, configured to: obtain current positioning information and history positioning information; and determine a positioning point in the current positioning information as the current positioning point in a case of determining that the current positioning information satisfies a preset condition according to the history positioning information.

In an embodiment, the apparatus further includes: a display control module, configured to control a current display interface to display a corresponding target route according to the target route information; and the switching module is further configured to control the current display interface to display the route guidance information.

For a specific limitation on the navigation apparatus, refer to the limitation on the navigation method above. Details are not described herein again. The modules in the foregoing navigation apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a terminal, and an internal structure diagram thereof may be shown in FIG. 9. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The communication interface of the computer device is configured to communicate with an external terminal in a wired or wireless manner. The wireless manner may be implemented through WiFi, an operator network, near field communication (NFC), or other technologies. The computer-readable instructions are executed by the processor to implement a navigation method.

Figure 9:
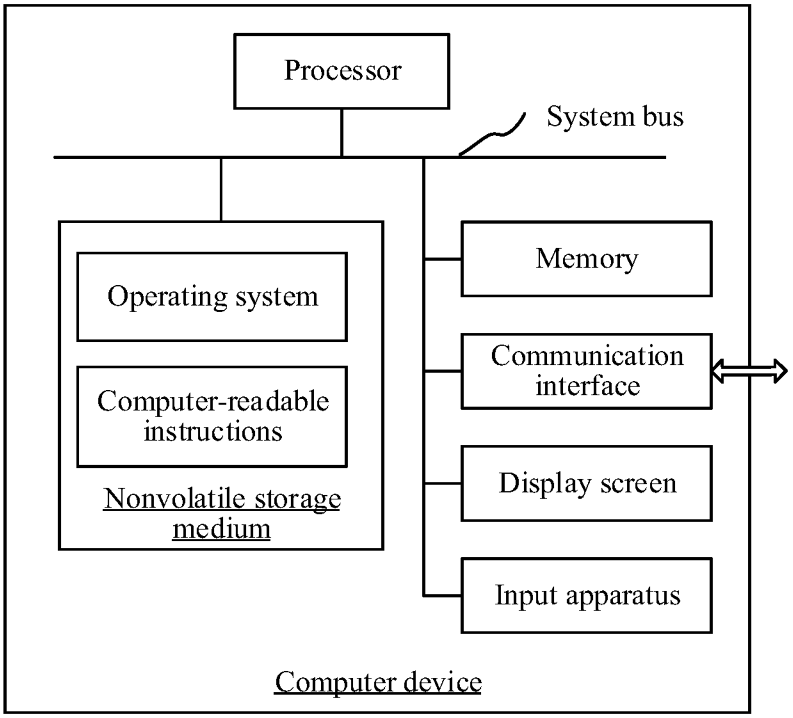
FIG. 9 is a diagram of an internal structure of a computer device according to an embodiment.

A person skilled in the art may understand that, the structure shown in FIG. 9 is only a block diagram of a part of a structure related to a solution of the disclosure and does not limit the computer device to which the solution of the disclosure is applied. Specifically, the computer device may include more or less members than those in FIG. 2A, or include a combination of some members, or include different member layouts.

In an embodiment, a computer device is provided, including a memory and a processor, the memory storing computer-readable instructions, the processor, when executing the computer-readable instructions, implementing the operations in the foregoing method embodiments.

In one embodiment, one or more non-volatile media storing computer-readable instructions are provided, the computer-readable instructions, when executed by one or more processors, to implement the operations in the foregoing method embodiments.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in the disclosure may include at least one of a non-volatile memory and a volatile memory. The non-volatile memory may include a read-only memory (ROM), a magnetic tape, a floppy disk, a flash memory, an optical memory, and the like. The non-volatile memory may include a read-only memory (ROM), a magnetic tape, a floppy disk, a flash memory, an optical memory, and the like. For the purpose of description instead of limitation, the RAM is available in a plurality of forms, such as a static RAM (SRAM) or a dynamic RAM (DRAM).

Technical features of the foregoing embodiments may be combined in different manners. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of the disclosure, which are described specifically and in detail, and therefore cannot be construed as a limitation to the patent scope of the present disclosure. A person of ordinary skill in the art may further make several variations and improvements without departing from the ideas of the disclosure, and such variations and improvements all fall within the protection scope of the disclosure. Therefore, the protection scope of the patent of the disclosure shall be subject to the appended claims.

What is claimed is:

1. A navigation method, performed by a computer device, comprising:

obtaining route information of a target route corresponding to a target start point and a target end point to obtain a route information set, the target route corresponding to a current navigation scenario and a next navigation scenario, wherein the current navigation scenario and the next navigation scenario are sequential, and wherein the current navigation scenario corresponds to a first travel mode and the next navigation scenario corresponds to a second travel mode different from the first travel mode;

determining target route information based on the route information set, the target route information comprising current sub-route information corresponding to the current navigation scenario and next sub-route information corresponding to the next navigation scenario;

providing route guidance according to the current sub-route information based on a first linear distance between a first current positioning point and a first navigation end point of the current navigation scenario, and further based on a first route distance between a first current location point and the first navigation end point, wherein the first current positioning point is determined by positioning not to be on the target route, and wherein the first current location point is a closest point on the target route to the first current positioning point;

switching to the next navigation scenario based on a second linear distance between a second current positioning point and the first navigation end point, and further based on a second route distance between a second current location point and the first navigation end point, wherein the second current positioning point is determined by positioning not to be on the target route, and wherein the second current location point is a closest point on the target route to the second current positioning point; and providing, to a user via a terminal device, route guidance according to the next sub-route information.

2. The navigation method according to claim 1, wherein the target route further comprises additional navigation scenarios and the target route information further comprises corresponding sub-route information for each of the additional navigation scenarios.

3. The navigation method according to claim 2, wherein before providing the route guidance according to the current sub-route information, the method further comprises:

when the first current positioning point is different than a first navigation end point of the current navigation scenario, obtaining route guidance information corresponding to the first current positioning point from the current sub-route information and determining a route guidance event carrying the route guidance information, wherein the providing route guidance according to the current sub-route information comprises providing route guidance according to the current sub-route information based on the route guidance event.

4. The navigation method according to claim 3, further comprising:

obtaining a navigation state set, wherein the navigation state set comprises a first state subset corresponding to the current navigation scenario, the first state subset comprising a first navigation sub-state corresponding to the current navigation scenario; and determining the first navigation sub-state as a current control state.

5. The navigation method according to claim 4, wherein the navigation state set further comprises an end state, and the method further comprises:

determining the end state as the current control state based on a determination that a fourth current positioning point is the same as the target end point to trigger ending of the navigation method.

6. The navigation method according to claim 4, wherein the navigation state set further comprises an end state, and the method further comprises:

determining the end state as the current control state, based on receiving a navigation end request to trigger ending of the navigation method.

7. The navigation method according to claim 4, wherein the first state subset comprises a first end sub-state corresponding to the current navigation scenario, and before the switching to a next navigation scenario, the method further comprises:

determining the first end sub-state corresponding to the current navigation scenario as the current control state, based on a determination that the second current positioning point is the same as the first navigation end point and is different than the target end point to trigger ending of the navigation method.

8. The navigation method according to claim 7, wherein the switching to the next navigation scenario comprises:

determining a second navigation sub-state corresponding to the next navigation scenario as the current control state.

9. The navigation method according to claim 4, wherein the first state subset corresponding to the current navigation scenario comprises a first yaw state corresponding to the current navigation scenario, and the method further comprises:

determining the first yaw state corresponding to the current navigation scenario as the current control state, based on a determination that the first current positioning point yaws from a route corresponding to the current navigation scenario, to trigger to obtain route re-planning information that has the first current positioning point as a start point and the first navigation end point as an end point and that corresponds to the current navigation scenario; and determining the first navigation sub-state corresponding to the current navigation scenario as the current control state again after the route re-planning information is obtained.

10. The navigation method according to claim 2, wherein before the switching to the next navigation scenario, the method further comprises:

determining, in a case that the first linear distance between the second current positioning point and the first navigation end point does not exceed a first preset distance threshold and the first route distance between the second current location point and the first navigation end point does not exceed a second preset distance threshold, that the second current positioning point is the same as the first navigation end point corresponding to the current navigation scenario.

11. The navigation method according to claim 9, further comprising:

determine, in a case that the first current positioning point yaws from a route corresponding to the current navigation scenario, a yaw event carrying the first current positioning point, wherein the determining the first yaw state corresponding to the current navigation scenario as the current control state is further based on the yaw event.

12. The navigation method according to claim 11, further comprising:

respectively obtaining location points of a preset number of consecutive positioning points up to the first current positioning point on the route corresponding to the current navigation scenario; and determining, in a case that distances between the preset number of consecutive positioning points up to the first current positioning point and corresponding location points all exceed a third preset distance threshold, that the first current positioning point yaws from the route corresponding to the current navigation scenario.

13. The navigation method according to claim 11, further comprising:

respectively obtaining location points of a preset number of consecutive positioning points up to the first current positioning point on the route corresponding to the current navigation scenario; and determining, in a case that angles between directions of route segments corresponding to the preset number of consecutive positioning points up to the first current positioning point and directions of route segments of location points exceed a preset angle threshold, that the first current positioning point yaws from the route corresponding to the current navigation scenario.

14. The navigation method according to claim 1, wherein after the determining target route information based on the route information set, the method further comprises:

causing a current display interface to display a corresponding target route according to the target route information; and causing the current display interface to display the route guidance.

15. The navigation method according to claim 1, wherein the method further comprises:

obtaining current positioning information and history positioning information; and determining a positioning point in the current positioning information as the first current positioning point based on that determining that the first current positioning point satisfies a preset condition according to the history positioning information.

16. A navigation apparatus comprising:

one or more processors; and memory storing computer-readable instructions that when executed by the one or more processors, cause the navigation apparatus to:

obtain route information of a target route corresponding to a target start point and a target end point to obtain a route information set, the target route corresponding a current navigation scenario and a next navigation scenario, wherein the current navigation scenario and the next navigation scenario are sequential, and wherein the current navigation scenario corresponds to a first travel mode and the next navigation scenario corresponds to a second travel mode different from the first travel mode;

determine target route information based on the route information set, the target route information comprising current sub-route information corresponding to the current navigation scenario and next sub-route information corresponding to the next navigation scenario;

provide route guidance according to the current sub-route information based on a first linear distance between a first current positioning point and a first navigation end point of the current navigation scenario, and further based on a first route distance between a first current location point and the first navigation end point, wherein the first current positioning point is determined by positioning not to be on the target route, and wherein the first current location point is a closest point on the target route to the first current positioning point;

switch to the next navigation scenario based on a second linear distance between a second current positioning point and the first navigation end point, and further based on a second route distance between a second current location point and the first navigation end point, wherein the second current positioning point is determined by positioning not to be on the target route, and wherein the second current location point is a closest point on the target route to the second current positioning point; and provide, to a user via a terminal device, route guidance according to the next sub-route information.

17. The navigation apparatus according to claim 16, wherein the target route further comprises additional navigation scenarios and the target route information further comprises corresponding sub-route information for each of the additional navigation scenarios.

18. The navigation apparatus according to claim 17, wherein the memory storing computer-readable instructions that when executed by the one or more processors, further causes the navigation apparatus to:

when the first current positioning point is different than a first navigation end point of the current navigation scenario, obtain route guidance information corresponding to the first current positioning point from the current sub-route information and determine a route guidance event carrying the route guidance information, wherein the providing route guidance according to the current sub-route information comprises providing route guidance according to the current sub-route information based on the route guidance event.

19. The navigation apparatus according to claim 18, further comprising:

obtaining a navigation state set, wherein the navigation state set comprises a first state subset corresponding to the current navigation scenario, the first state subset comprising a first navigation sub-state corresponding to the current navigation scenario; and determining the first navigation sub-state as a current control state.

20. A non-transitory computer-readable storage medium, storing computer code that when executed by at least one processor causes the at least one processor to:

obtain route information of a target route corresponding to a target start point and a target end point to obtain a route information set, the target route corresponding a current navigation scenario and a next navigation scenario, wherein the current navigation scenario and the next navigation scenario are sequential, and wherein the current navigation scenario corresponds to a first travel mode and the next navigation scenario corresponds to a second travel mode different from the first travel mode;

determine target route information based on the route information set, the target route information comprising current sub-route information corresponding to the current navigation scenario and next sub-route information corresponding to the next navigation scenario;

provide route guidance according to the current sub-route information based on a first linear distance between a first current positioning point and a first navigation end point of the current navigation scenario, and further based on a first route distance between a first current location point and the first navigation end point, wherein the first current positioning point is determined by positioning not to be on the target route, and wherein the first current location point is a closest point on the target route to the first current positioning point;

switch to the next navigation scenario based on a second linear distance between a second current positioning point and the first navigation end point, and further based on a second route distance between a second current location point and the first navigation end point, wherein the second current positioning point is determined by positioning not to be on the target route, and wherein the second current location point is a closest point on the target route to the second current positioning point; and provide, to a user via a terminal device, route guidance according to the next sub-route information.

* * * * *